United States Patent
Bouttier et al.

(10) Patent No.: US 10,541,847 B2
(45) Date of Patent: Jan. 21, 2020

(54) METHOD AND DEVICE FOR FORMING DFT-SPREAD OFDM SYMBOL INCLUDING DATA AND PILOTS

(71) Applicant: MITSUBISHI ELECTRIC CORPORATION, Tokyo (JP)

(72) Inventors: Arnaud Bouttier, Rennes (FR); Loic Brunel, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/771,041

(22) PCT Filed: Dec. 14, 2016

(86) PCT No.: PCT/JP2016/088006
§ 371 (c)(1),
(2) Date: Apr. 25, 2018

(87) PCT Pub. No.: WO2017/110835
PCT Pub. Date: Jun. 29, 2017

(65) Prior Publication Data
US 2019/0058622 A1    Feb. 21, 2019

(30) Foreign Application Priority Data

Dec. 21, 2015  (EP) ..................................... 15201729

(51) Int. Cl.
*H04L 27/26* (2006.01)
(52) U.S. Cl.
CPC ...... *H04L 27/2636* (2013.01); *H04L 27/2613* (2013.01)
(58) Field of Classification Search
CPC ............. H04L 27/2636; H04L 27/2613; H04L 25/03343
See application file for complete search history.

(56) References Cited

U.S. PATENT DOCUMENTS

2010/0215031 A1*  8/2010  Kim .................... H04L 5/0021
                                                        370/344

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation", Dec. 2011, pp. 1-101.
(Continued)

*Primary Examiner* — Sophia Vlahos
(74) *Attorney, Agent, or Firm* — Birch, Stewart, Kolasch & Birch, LLP (57) ABSTRACT

A method and a device for forming a DFT-spread OFDM symbol including data and pilots, comprising:
  forming a pilot symbol in the time domain, the pilot symbol comprising at least two parts, a first part of the pilot symbol comprising samples of front pilots, a second part of the pilot symbol comprising null values,
  performing a DFT-spread OFDM modulation of the pilot symbol,
  precoding the data,
  putting the precoded data under the form of a data symbol in the time domain, the data symbol comprising at least two parts, a first part of the data symbol comprising null values, a second part of the data symbol comprising the data,
  performing a DFT-spread OFDM modulation of the data symbol,
  modifying a part of the DFT-spread OFDM modulated data symbol,
  combining the modified DFT-spread OFDM modulated data to the DFT-spread OFDM modulated pilot symbol.

12 Claims, 4 Drawing Sheets

(56) References Cited

OTHER PUBLICATIONS

Coleman, Thomas F. and Li, Yuying, "A reflective Newton method for minimizing a quadratic function subject to bounds on some of the variables", Dec. 7, 1992, pp. 1-37.
Digital Video Broadcasting (DVB); Next Generation broadcasting system to Handheld, physical layer specification, DVB Document A160 issued on Nov. 2012, pp. 1-68.
Draft ETSI EN 303 105 V1.1.1, Digital Video Broadcasting (DVB); Next Generation broadcasting system to Handheld, physical layer specification (DVB-NGB), pp. 69-295.

* cited by examiner

METHOD AND DEVICE FOR FORMING DFT-SPREAD OFDM SYMBOL INCLUDING DATA AND PILOTS

TECHNICAL FIELD

The present invention relates generally to a method and a device for forming a DFT-spread OFDM symbol comprising data and pilot.

BACKGROUND ART

The Discrete Fourier Transform spread Orthogonal Frequency Division Multiplexing (DFT-spread OFDM) modulation is more and more used in the telecommunication technologies.

For example, DFT-spread OFDM is used to implement the uplink transmissions in 3GPP/LTE networks under the acronym of SC-FDMA (Single Carrier Frequency Division Multiple Access) as disclosed in Non Patent Literature 1.

For example, DFT-spread OFDM is used to implement the satellite component of the DVB-NGH system hybrid profile (see Non Patent Literature 2).

In the two aforementioned systems, DFT-spread OFDM was selected due to its low power envelope fluctuations, a key enabler for reducing the power consumption at the transmitter. DFT-spread OFDM actually combines the suitable properties of Single Carrier (SC) and Multiple Carrier (MC) waveforms, i.e. the low power fluctuations of Single Carrier modulations with the flexibility and low receiver complexity of Multiple Carrier modulations.

In the DFT-spread OFDM modulation, the constellation samples are first spread in frequency by means of a DFT. After addition of null sub-carriers at the two band edges, the spread symbols are OFDM modulated to obtain a signal with the expected spectral shape. The combination of a DFT for spreading and an IDFT for modulation, provides a resulting signal that may be simply understood as the oversampled version of the original samples that would be filtered out with a Dirichlet waveform, also known as Dirichlet kernel, the equivalent in DFT interpolation of the cardinal sine function or sine function in continuous time interpolation.

This is actually the principle of the well-known FFT or Fourier oversampling algorithm. It may be considered that the DFT-spread OFDM modulation can be interpreted as an alternative to basic time domain filtering to implement the generation of a Single Carrier signal. Due to the circularity of the DFT convolution, the first and last samples over each OFDM symbols are significantly correlated to each other over a number of more or less $4\text{-}6 \times N'/K'$ samples, i.e. the first 2 or 3 lobes of the Dirichlet waveform, where $N'$ is the number of samples after OFDM modulation and $K'$ is the number of samples after the DFT transform.

The classical OFDM modulation is particularly well suited for frequency selective channels as the impact of the channel can readily be retrieved by means of a simple one-tap equalizer over each sub-carrier. To compute the equalizer coefficients, the receiver needs to estimate the channel coefficients over all the data sub-carriers.

An accurate channel estimation appears as a key functionality of the OFDM receiver. The channel is generally estimated using reference symbols also called pilots known at the receiver. Unlike with Single Carrier signals, it is possible in OFDM to adjust the ratio data/pilot according to the channel properties in both the frequency and time domains. For instance, if the channel coherence bandwidth is very high but the channel changes rapidly, it is possible to insert only a few pilots in the frequency domain, for example 1 pilot every $\gamma \gg 1$ sub-carriers, regularly spaced in time, for example one OFDM symbol every few $\delta$ symbols. It is even possible to change the position of the pilots from time to time.

This is one of the main advantages of the OFDM modulation with respect to Single Carrier modulation and DFT-spread OFDM modulation.

If the DFT-spread OFDM modulation benefits from its OFDM lineage for the equalization, it is not the case for the insertion of pilots. Indeed, the low power fluctuations of DFT-spread OFDM signal envelope result from the OFDM modulation of DFT-spread symbols. Any arbitrary alteration of the spread sub-carriers through for instance the insertion of reference sub-carriers may break the Peak to Average Power Ratio (PAPR) properties of the signal. For that reason, the 3GPP/LTE uplink system specifies a full pilot, i.e. all the modulated sub-carriers of a symbol carrying pilots, directly inserted in the frequency domain as a Zadoff-Chu sequence. Zadoff-Chu sequences have constant amplitude and remain a Zadoff-Chu sequence after a DFT. The transmitted pilot thus keeps the good PAPR properties of a Single Carrier signal.

In order to reduce the pilot overhead, the DVB-NGH system specifies a pilot that combines data and reference information (hereafter called hybrid pilot symbol). Data are obtained by applying a spreading DFT over a block of data with a length equal to half the size of a DFT used if no pilot is inserted. Then, spread data are interleaved one every two sub-carriers along with a spread Zadoff-Chu sequence (also with half length with respect to a regular data symbol). For each component of the reference symbol (data and pilots), the resulting signal is simply the oversampled version of two consecutive copies of the original half-length sequence.

As the sum of two Single Carrier signals, the resulting signal is no more a pure SC signal.

CITATION LIST

Non Patent Literature

[NPL 1]
A document 3GPP TS 36.211 v10.4.0, entitled "3rd Generation Partnership Project; Technical Specification Group Radio Access Network; Evolved Universal Terrestrial Radio Access (E-UTRA); Physical Channels and Modulation," issued on December 2011.

[NPL 2]
Digital Video Broadcasting (DVB); Next Generation broadcasting system to Handheld, physical layer specification, DVB Document A160 issued on November 2012 under the acronym of SC-OFDM (Single Carrier-Orthogonal Frequency Division Multiplexing

[NPL 3]
A paper of Coleman, T. F. and Y. Li entitled "A Reflective Newton Method for Minimizing a Quadratic Function Subject to Bounds on Some of the Variables," published in SIAM Journal on Optimization, Vol. 6, Number 4, pp. 1040-1058, 1996

[NPL 4]
A book of Gill, P. E., W. Murray, and M. H. Wright. Entitled Practical Optimization, Academic Press, London, U K, 1981

[NPL 5]
Draft ETSI EN 303 105 V1.1.1, "Digital Video Broadcasting (DVB); Next Generation broadcasting system to Handheld, physical layer specification (DVB-NGH)," June 2013

SUMMARY OF INVENTION

Technical Problem

The present invention aims at providing a method and a device which enable to generate a reference symbol for DFT-spread OFDM modulation with the ability to control the data/pilot sub-carriers ratio in the pilot symbols according to the channel needs still keeping the low PAPR properties of Single Carrier signals.

Solution to Problem

To that end, the present invention concerns a method for forming a DFT-spread OFDM symbol comprising data and pilots, characterized in that the method comprises the steps of:
  forming a pilot symbol in the time domain, the pilot symbol comprising at least two parts, a first part of the pilot symbol comprising samples of front pilots, a second part of the pilot symbol comprising null values and being consecutive to the first part of the pilot symbol,
  performing a DFT-spread OFDM modulation of the pilot symbol,
  precoding the data in order to compensate a modification of the data contribution onto a part of the DFT-spread OFDM modulated data symbol corresponding to the first part of the data symbol prior to the DFT-spread OFDM modulation,—putting the precoded data under the form of a data symbol in the time domain, the data symbol comprising at least two parts, a first part of the data symbol comprising null values, a second part of the data symbol comprising the data, the second part of the data symbol being consecutive to the first part of the data symbol,
  performing a DFT-spread OFDM modulation of the data symbol,
  modifying the part of the DFT-spread OFDM modulated data symbol corresponding to the first part of the data symbol prior to the DFT-spread OFDM modulation in order to form a DFT-spread OFDM modulated data symbol to be combined,
  combining the DFT-spread OFDM modulated data symbol to be combined to the DFT-spread OFDM modulated pilot symbol in order to form a full DFT-spread OFDM symbol.

The present invention also concerns a device for forming a DFT-spread OFDM symbol comprising data and pilots, characterized in that the device comprises:
  means for forming a pilot symbol in the time domain, the pilot symbol comprising at least two parts, a first part of the pilot symbol comprising front pilots, a second part of the pilot symbol comprising null values and being consecutive to the first part of the pilot symbol,
  means for performing a DFT-spread OFDM modulation of the pilot symbol,
  means for precoding the data in order to compensate a modification of the data contribution onto a part of the DFT-spread OFDM modulated data symbol corresponding to the first part of the data symbol prior to the DFT-spread OFDM modulation,
  means for putting the precoded data under the form of a data symbol in the time domain, the data symbol comprising at least two parts, a first part of the data symbol comprising null values, a second part of the data symbol comprising the data, the second part of the data symbol being consecutive to the first part of the data symbol,
  means for performing a DFT-spread OFDM modulation of the data symbol,
  means for modifying the part of the DFT-spread OFDM modulated data symbol corresponding to the first part of the data symbol prior to the DFT-spread OFDM modulation in order to form a DFT-spread OFDM modulated data symbol to be combined,
  means for combining the DFT-spread OFDM modulated data symbol to be combined to the DFT-spread OFDM modulated pilot symbol in order to form a full DFT-spread OFDM symbol.

Thus, the present invention enables to generate a symbol for DFT-spread OFDM modulation with the ability to control the data/pilot sub-carriers ratio in the symbols according to the channel needs still keeping the low power envelope fluctuations properties of Single Carrier signals.

According to a particular feature, pilot samples at the end of the first part of the pilot symbol are copied at the beginning of the first part of the pilot symbol.

Thus, the receiver is able to accurately estimate the channel in the FFT domain from the extraction of the front pilot used as reduced length reference OFDM pilot with a channel that appears as circular thanks to the insertion of a cyclic prefix related to this reduced length OFDM symbol.

According to a particular feature, the modification of the data contribution after a DFT-spread OFDM modulation of the data symbol consists in zeroing the part of the DFT-spread OFDM modulated data symbol corresponding to the first part of the data symbol prior to the DFT-spread OFDM modulation.

Thus, the front pilot does not contain any contribution from the unknown data samples, thus enabling an accurate estimation of the channel at the receiver using the value of the front pilot known at the receiver.

According to a particular feature, the size of the first part of the data symbol is identical to the size of the first part of the pilot symbol and the size of the second part of the data symbol is identical to the size of the second part of the pilot symbol.

Thus, the data part can be DFT-spread OFDM demodulated without interference from the pilot samples.

According to a particular feature, the pilot symbol comprises a third part, the third part of the pilot symbol comprising end pilots and is consecutive to the second part of the pilot symbol, the data symbol comprising a third part, the third part of the data symbol comprising null values and being consecutive to the second part of the data symbol.

Thus, the data part is protected from the effect of a lack of circularity for the overall symbol, the cyclic prefix being inserted with respect to the front pilots and not the last part of the OFDM symbol as commonly done in OFDM.

According to a particular feature, the modification of the data contribution after a DFT-spread OFDM modulation of the data symbol is further performed onto the end pilot.

Thus, it is possible to mitigate the contribution of the data onto the end pilots after DFT-spread OFDM modulation thus simplifying the generation of end pilots according to any required needs.

According to a particular feature, the samples of the end pilots are determined so as to be as identical as possible to the samples copied at the beginning of the first part of the pilot symbol.

Thus, the inserted cyclic prefix is relevant for both the OFDM demodulation of the front pilot and the full DFT-spread OFDM modulated symbol.

According to a particular feature, the samples of the end pilots determined so as to be as identical as possible to the samples inserted at the beginning of the first part of the pilot symbol are determined according to a constrained quadratric distance.

Thus, the pilot samples can be computed with a low complexity algorithm.

According to a particular feature, the modification of the data contribution after a DFT-spread OFDM modulation of the data symbol consists in zeroing the part of the DFT-spread OFDM modulated data symbol corresponding to the third part of the data symbol prior to the DFT-spread modulation.

Thus, it is possible to cancel the contribution of the data onto the end pilots after DFT-spread OFDM modulation thus simplifying the generation of end pilots to any required needs.

According to a particular feature, the size of the third part of the data symbol is identical to the size of the third part of the pilot symbol.

Thus, the data part can be DFT-spread OFDM demodulated without interference from the end pilot samples.

According to a particular feature, the part of the DFT-spread OFDM modulated pilot symbol corresponding to the second part of the pilot symbol prior to the DFT-spread OFDM modulation is not modified.

Thus, data can be demodulated without being interfered by any contribution originating from the pilot samples.

According to still another aspect, the present invention concerns computer programs which can be directly loaded into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example embodiment, the said description being produced with reference to the accompanying drawings.

DESCRIPTION OF EMBODIMENTS

Figure 1:
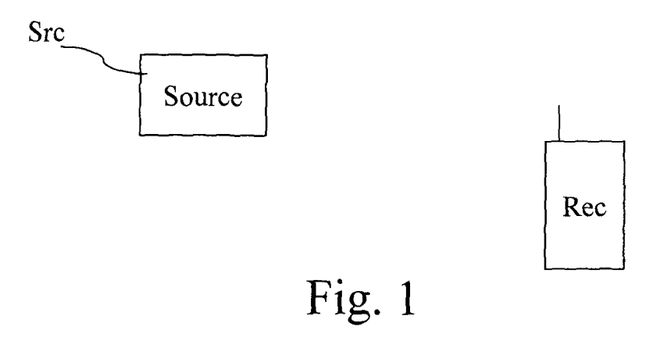
FIG. 1 represents a wireless system in which the present invention is implemented.

FIG. 1 represents a wireless system in which the present invention is implemented. The present invention will be disclosed in an example in which the signals transferred by a source Src are transferred to receivers Rec.

For example, the source Src may be included in a satellite or in a terrestrial transmitter and transfers signals to at least one receiver.

The receiver Rec may be mobile or not.

According to the invention, the source Src:
forms a pilot symbol in the time domain, the pilot symbol comprising at least two parts, a first part of the pilot symbol comprising samples of front pilots, a second part of the pilot symbol comprising null values and being consecutive to the first part of the pilot symbol,
performs a DFT-spread OFDM modulation of the pilot symbol,
precodes the data in order to compensate a modification of the data contribution onto a part of the DFT-spread OFDM modulated data symbol corresponding to the first part of the data symbol prior to the DFT-spread OFDM modulation,
puts the precoded data under the form of a data symbol in the time domain, the data symbol comprising at least two parts, a first part of the data symbol comprising null values, a second part of the data symbol comprising the data, the second part of the data symbol being consecutive to the first part of the data symbol,
performs a DFT-spread OFDM modulation of the data symbol,
modifies the part of the DFT-spread OFDM modulated data symbol corresponding to the first part of the data symbol prior to the DFT-spread OFDM modulation in order to form a DFT-spread OFDM modulated data symbol to be combined,
combines the DFT-spread OFDM modulated data symbol to be combined to the DFT-spread OFDM modulated pilot symbol in order to form a full DFT-spread OFDM symbol.

Figure 2:
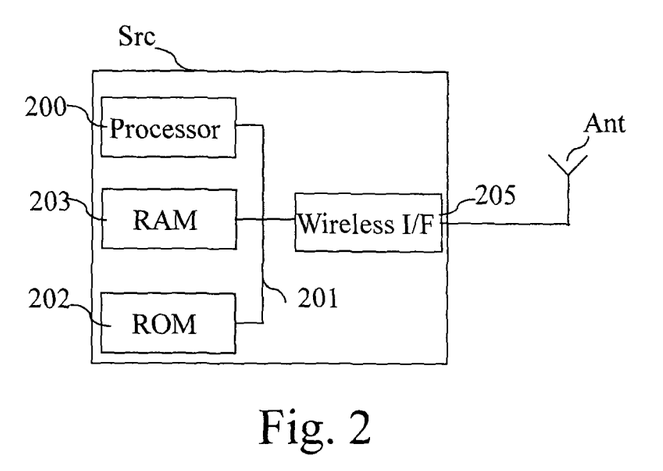
FIG. 2 is a diagram representing the architecture of a source in which the present invention is implemented.

FIG. 2 is a diagram representing the architecture of a source in which the present invention is implemented.

Figure 4:
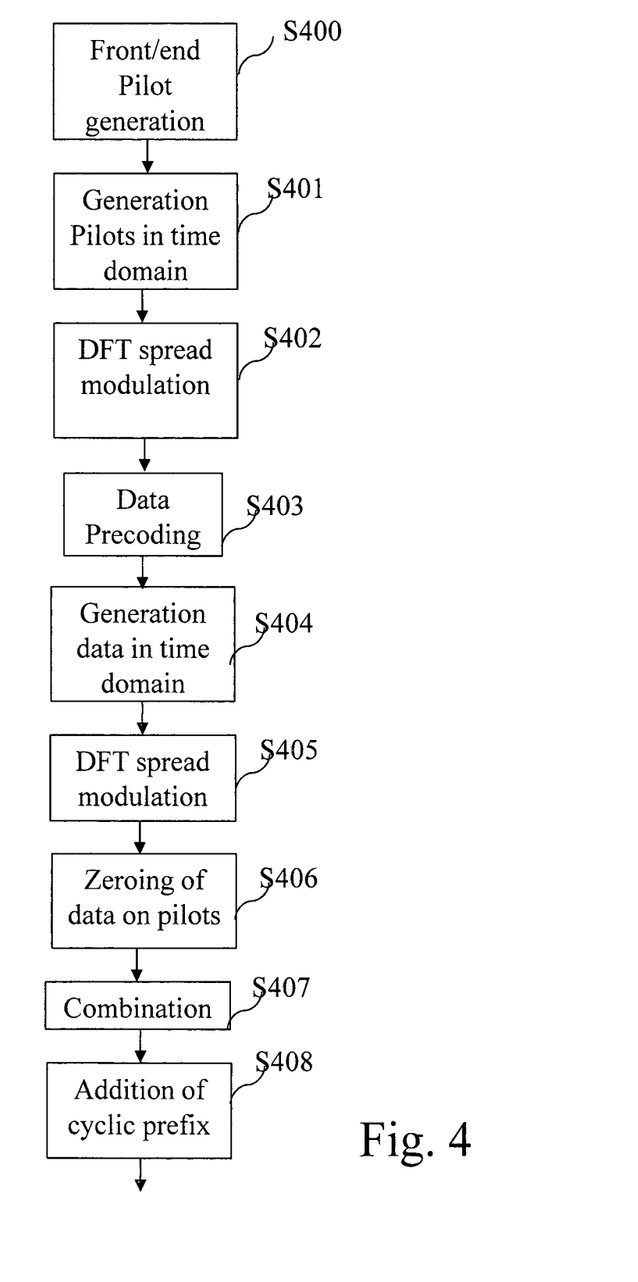
FIG. 4 represents an algorithm executed by the source in order to form DFT-spread OFDM symbols according to the present invention.

The Source Src has, for example, an architecture based on components connected together by a bus 201 and a processor 200 controlled by the program as disclosed in FIG. 4.

It has to be noted here that the Source Src may have an architecture based on dedicated integrated circuits.

The bus 201 links the processor 200 to a read only memory ROM 202, a random access memory RAM 203 and a wireless interface 205.

The memory 203 contains registers intended to receive variables and the instructions of the programs related to the algorithm as disclosed in FIG. 4.

The processor 200 controls the operation of the wireless interface 205.

The read only memory 202 contains instructions of the program related to the algorithm as disclosed in FIG. 4, which are transferred, when the Source Src is powered on, to the random access memory 203.

Any and all steps of the algorithm described hereafter with regard to FIG. 4 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the Source Src includes circuitry, or a device including circuitry, causing the Source Src to perform the steps of the algorithm described hereafter with regard to FIG. 4.

Figure 3:
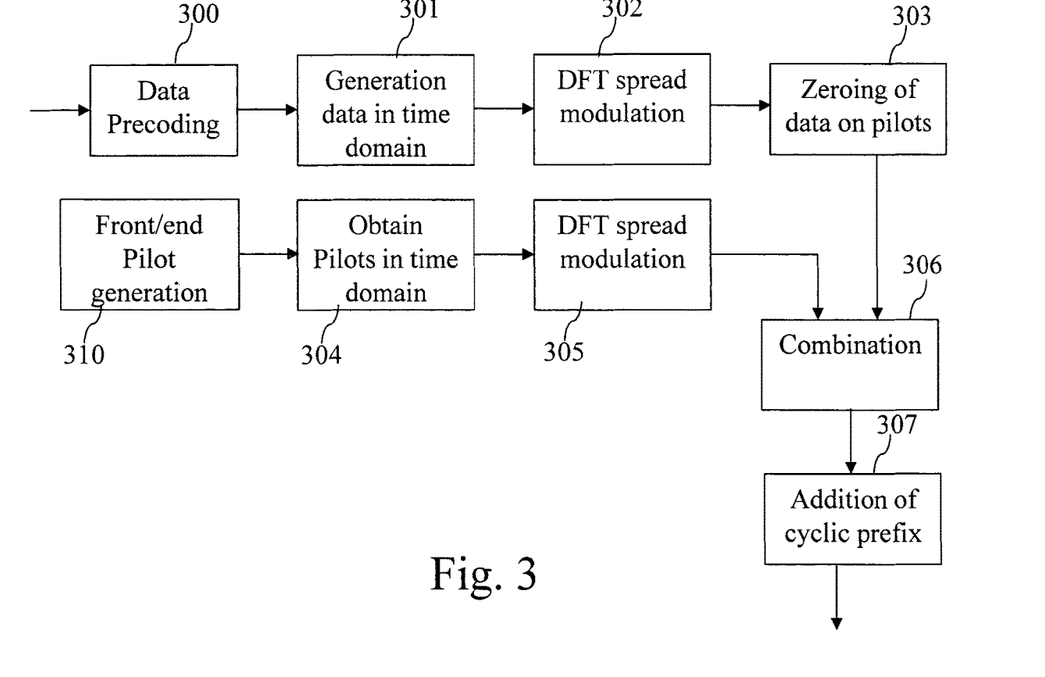
FIG. 3 is a diagram representing an example of the architecture of a wireless interface of the source according to the present invention.

FIG. 3 is a diagram representing an example of the architecture of a wireless interface of the source according to the present invention.

The wireless interface 205 comprises a front and end pilots generation module 310 that computes the value of the reference samples that are used for generating the DFT-spread OFDM signal. The pilot and data contributions in the final DFT-spread OFDM symbol are computed separately to be combined at a later stage taking advantage of the linearity of the DFT-spread OFDM modulation.

The DFT-spread OFDM modulation may be expressed as follows. Let us denote by $x_k$ the data symbols which are parsed into data blocks x of size M. The i-th data block $x^{(i)}$ is written as:

$$x^{(i)} = [x_0^{(i)}, \ldots, x_{M-1}^{(i)}]^T$$

Where $[\ ]^T$ is the transpose of row vector $[\ ]$.

Data blocks $x^{(i)}$ are first "spread" in frequency using a M-point normalized Discrete Fourier Transform (DFT) as follows:

$$s^{(i)} = F_M x^{(i)},$$

where $F_M$ is the M-point normalized Discrete Fourier Transform (DFT) under the form of an (M, M) matrix with elements $F_{k,n} = \omega_M^{kn}/\sqrt{M}$ on the k-th row and n-th column, where $k, n = 0 \ldots M-1$, $\omega_M = \exp(j2\pi/M)$ being a primitive root of unity. The resulting vector is then mapped onto a set of M out of N inputs of an inverse DFT by the sub-carrier mapping (N, M) matrix Q, resulting in the N-sized vector $z^{(i)}$:

$$z^{(i)} = Qs^{(i)},$$

where the mapping matrix Q is basically used to insert null sub-carriers on the two band edges of the M sub-carriers. The signal above can also be expressed as a function of the original samples:

$$z^{(i)} = Qs^{(i)} = QF_M x^{(i)} = QF_M x^{(i)} \stackrel{def}{=} Gx^{(i)},$$

where G is a (N, M) matrix and $\stackrel{def}{=}$ denotes is equal by definition.

Finally, the SC-OFDM signal is generated by applying an N-point normalized inverse Discrete Fourier Transform (DFT) onto the sub-carriers vector:

$$y^{(i)} = F_N^H z^{(i)} = F_N^H Qs^{(i)} = F_N^H QF_M x^{(i)} \stackrel{def}{=} Hx^{(i)}.$$

where H is a (N, M) matrix, $F_N$ is the N-point normalized Discrete Fourier Transform (DFT) under the form of an (N, N) matrix with elements $F_{k,n} = \omega_{k,n} = \omega_N^{kn}/\sqrt{N}$ on the k-th row and n-th column, $[\ ]^H$ is the Hermitian transform (conjugate and transpose) of matrix $[\ ]$.

Assuming a transmission over an ideal channel with no channel dispersion and no noise, the demodulation can also be expressed using a matrix formulation as follows:

$$\tilde{s}^{(i)} = F_M^H \overline{Q} F_N y^{(i)} \stackrel{def}{=} \overline{H} y^{(i)},$$

where $\overline{H}$ is a (M, N) matrix and where the demapping matrix $\overline{Q}$ is basically used to extract the sub-carriers comprising data getting rid of the null sub-carriers on the two band edges of the M sub-carriers carrying information.

In practice, the signal is received through a frequency selective, possibly time-varying, channel with additive white gaussian noise (AWGN), effects that need to be mitigated at the receiver. DFT-spread OFDM can be viewed as a precoded OFDM scheme such as MC-CDMA (Multi Carrier-Code Division Multiple Access). As for any OFDM-based scheme, it is possible to demodulate the DFT-spread OFDM modulation relying on the frequency domain equalization (FDE) inverse filtering approach commonly used for OFDM signals. The receiver first estimates the channel from pilot symbols known at the receiver. Basically, the receiver performs the OFDM demodulation of the pilots and estimates the value of the channel coefficients for the sub-carriers carrying a reference sample by dividing the demodulated samples by the known value of the pilot samples. The obtained channel coefficients are used to estimate the channel for all the sub-carriers (frequency domain) and OFDM symbols (time domain) by any appropriate means, usually an interpolation filtering that may also serve for noise reduction. From the channel coefficients, the receiver is able to compute the coefficients of a Zero Forcing (ZF) or Minimum Mean Square Error (MMSE) equalizer.

After equalization, the signal is de-spreaded and the Log-Likelihood Ratio (LLR) soft bits are computed after normalization and soft-demapping. Under some mild simplifications, the DFT-spread OFDM receiver can be made advantageously similar to a pure OFDM receiver with the obvious requirement of inserting the IDFT de-spreader function.

For clarity, the reference to the OFDM symbol number (i) under processing will be ignored in the sequel. In the present case, the data block used to generate the hybrid pilot symbol is made of three distinct parts: the front pilot, the data part and eventually the end pilot:

$$x = [f^T d^T e^T]^T,$$

where f is the vector of front pilots as disclosed hereinafter with size K, e the vector of the end pilots as disclosed hereinafter with size $L \leq K$ and d the vector of transmitted user data with size M−K−L.

It has to be noted here that the end pilots may be omitted if the hybrid pilot symbols are consecutive. In such case the front pilots of a next hybrid pilot symbols replace the end pilot of a current hybrid pilot symbol.

According to the DFT-spread OFDM modulation, the symbol generated after modulation is more or less the oversampled version of the original set of samples x. The length of each of the three parts after modulation is obtained by multiplying their length (respectively K, M−K−L and L) with the oversampling factor N/M.

According to the present invention, the receiver can extract the portion of samples corresponding to the front pilots and use it as a reference OFDM symbol for channel estimation. The length of the P pilots obtained after the DFT-spread modulation shall be selected such that the FFT bins of the shorter OFDM symbol fall on sub-carriers of the longer OFDM symbol, (with size N) i.e. the ratio N/P is an integer. The number of samples K required to generate the P pilots obtained after the DFT-spread modulation shall be selected such as:

$$K = \text{ceil}\left(P \times \frac{M}{N}\right),$$

where ceil(x) is the smallest integer not less than x. In other words, the portion of signal generated from the K samples ends up between the samples with indices P-1 and P, the part selected as front pilots after DFT-spread OFDM modulation being the first P samples.

The receiver can then extract the P first samples corresponding to the filtered front pilot samples and perform an OFDM demodulation over this reduced length OFDM symbol known at the receiver. According to this principle, the receiver is able to estimate the channel at regularly spaced sub-carriers, in some sense similarly to scattered OFDM pilots, still keeping the good PAPR properties of the generated signal.

Similarly, the number of samples L required to generate the last R pilot samples obtained after the DFT-spread OFDM modulation shall be selected such as:

$$L = \text{ceil}\left(R \times \frac{M}{N}\right),$$

As it will be disclosed hereinafter, the front and end pilot generation module 310 generates pilot samples so that after DFT-spread OFDM modulation the end pilot (last R samples of the overall symbol) closely resembles to the last samples of the front pilot (samples with indices ranging from P-R to P-1) that are used for insertion of a cyclic prefix. Doing so, the cyclic prefix is valid for both the channel estimation and the demodulation of the overall symbol and consecutively of the data samples.

As the contribution of data samples prior DFT-spread OFDM modulation onto the first P and last R samples of the generated signal after DFT-spread OFDM modulation is removed as disclosed hereinafter, only the contribution of the front and end pilots onto the first P and last R samples of the generated symbol is first computed. In general, the generated signal can be expressed as follows:

$$y = H[f^T d^T e^T]^T \stackrel{def}{=} y^f + y^d + y^e = H^f f + H^d d + H^e e$$

where $H^f = H_{[0:N-1;0:K-1]}$ is the (N, K) matrix obtained by selecting, in the matrix H, the first K columns, $H^e = H_{[0:N-1; 0:M-L:M-1]}$ is the (N, L) matrix obtained by selecting, in the matrix H, the L last columns and $H^d = H_{[0:N-1;K:M-L-1]}$ is the (N, M–K–L) matrix obtained by selecting, in the matrix H, the remaining M–K–L columns, $y^f$ is the contribution of the front pilot before DFT-spread OFDM modulation on the generated signal after DFT-spread OFDM modulation, $y^d$ is the contribution of the data before DFT-spread OFDM modulation on the generated signal after DFT-spread OFDM modulation and $y^e$ is the contribution of the end pilot before DFT-spread OFDM modulation onto the generated signal after DFT-spread OFDM modulation. The contribution of the K pilot samples on the first P and last R samples of the generated signal are thus given by:

$$y^{ff} = H_{[0:P-1;0:K-1]} f$$

$$y^{fe} = H_{[N-R:N-1;0:K-1]} f$$

where $y^{ff}$ is the contribution of the K pilot samples prior DFT-spread OFDM modulation on the first P of the generated signal after DFT-spread OFDM modulation and $y^{fe}$ is the contribution of the K pilot samples prior DFT-spread OFDM modulation on the last R of the generated signal after DFT-spread OFDM modulation. The contribution of the last L end pilots on the first P and last R samples of the generated signal are thus given by:

$$y^{ef} = H_{[0:P-1;0:L-1]} e$$

$$y^{ee} = H_{[N-R:N-1;0:L-1]} e$$

Where $y^{ef}$ is the contribution of the L end pilot samples prior DFT-spread OFDM modulation on the first P samples of the generated signal after DFT-spread OFDM modulation and $y^{ee}$ is the contribution of the L end pilot samples prior DFT-spread OFDM modulation on the last R samples of the generated signal after DFT-spread OFDM modulation.

The objective is here to find front pilots f and end pilots e that minimize the error between the last R samples of the generated overall symbol (samples with indices between N-R and N-1) and the last R samples of the front pilots after DFT-spread OFDM modulation (samples with indices between P-R and P-1). Ideally, these samples shall guarantee the equality:

$$y^{ff}_{[P-R:P-1]} + y^{ef}_{[P-R:P-1]} = y^{fe} + y^{ee}$$

$$H^f_{[P-R:P-1;0:K-1]} f + H^e_{[P-R:P-1;0:L-1]} e = H^f_{[N-R:N-1;0:K-1]} f + H^e_{[N-R:N-1;0:L-1]} e$$

$$\left[ (H^f_{[P-R:P-1;0:K-1]} - H^f_{[N-R:N-1;0:K-1]}) \quad (H^e_{[P-R:P-1;0:K-1]} - H^e_{[N-R:N-1;0:L-1]}) \right] \begin{bmatrix} f \\ e \end{bmatrix} = [0]_R$$

Where $[0]_R$ is a vector with R rows equal to zero.

A vector that belongs to the kernel of the matrix with size (R, K+L) defined above is looked for. As long as the matrix is full rank, the rank of the kernel is equal to K+L–R.

It is proposed here to retain the vector that minimizes in the least square sense the distance between the first K samples of a demodulated pilot vector with respect to a reference vector selected for its good PAPR properties. Let's denote such a vector $f_{ref}$ with size K. The contribution of the front and end pilots over the generated signal is given by:

$$y^{f,e} = H^{f,e} [f^T e^T]^T$$

Where $H^{f,e} = H_{[0:N-1;0:K-1 \cup M-L:M-1]}$ is the (N, K+L) matrix obtained by selecting in the matrix H the K first and L last columns.

The overall contribution of this signal after DFT-spread OFDM demodulation is:

$$\overline{s}^{f,e} = \overline{H} y^{f,e}$$

The part $\overline{s}^{f,e}_{[0:K-1]}$ corresponding to the first K samples is thus defined as:

$$\overline{s}^{f,e} = \overline{H}_{[0:K-1;0:N-1]} H^{f,e} [f^T e^T]^T$$

The final system to be solved is as follows:

$$\min_{h,e} \left\| \overline{s}^{f,e}_{[0:K-1]} - f_{ref} \right\|^2 = \left\| \overline{H}_{[0:K-1;0:N-1]} H^{f,e} [f^T e^T]^T - f_{ref} \right\|^2,$$

under the constraint $$\left[ (H^f_{[P-R:P-1;0:K-1]} - H^f_{[N-R:N-1;0:K-1]}) \quad (H^e_{[P-R:P-1;0:L-1]} - H^e_{[N-R:N-1;0:L-1]}) \right] \begin{bmatrix} f \\ e \end{bmatrix} = [0]_R$$

The resolution of such a system may be performed using for example the method disclosed in Non Patent Literature 3 or the method disclosed in Non Patent Literature 4.

The output of the front pilots (K samples) and the end pilots (L samples) generation module 310 is provided to a pilot generation module in the time domain 304.

The pilot generation module in the time domain 304 inserts pilots in the time domain prior to DFT spreading, i.e. with the ability to control the data/pilot ratio. More specifically, a number K of pilots are inserted at the beginning of the data to be modulated.

The pilot generation module in the time domain 304 maps the pilots in the time domain.

Figure 5A:
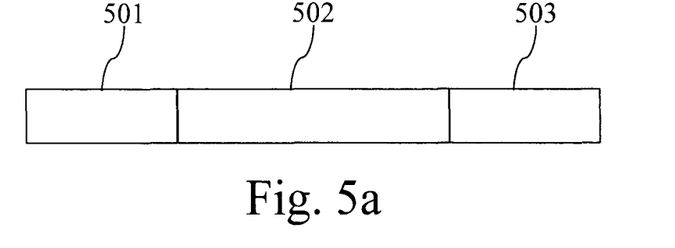
FIG. 5 discloses different views of samples used to form a DFT-spread OFDM symbol according to the present invention.
Figure 5B:
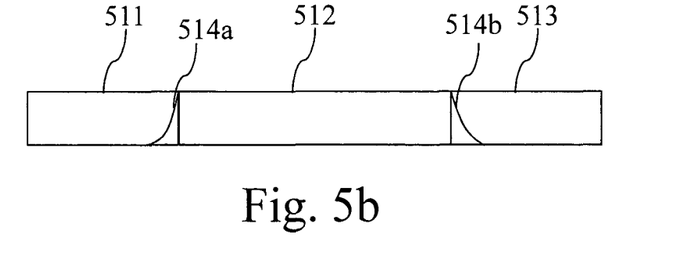
Figure 5C:
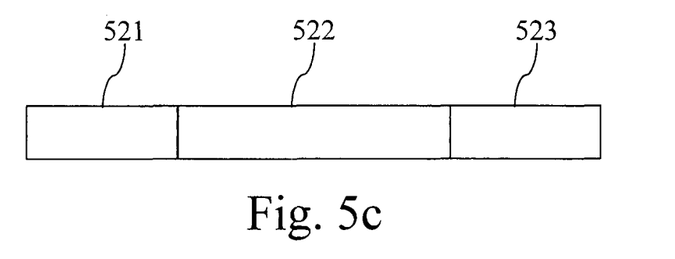

FIG. 5c is an example of a pilot block formed by the pilot generation module in the time domain 304.

The pilot block is decomposed into three parts.

A part noted 521 comprises K front pilots as disclosed hereinafter, the following part noted 522 comprises M-K-L null values and the last part noted 523 comprises L end pilots as disclosed hereinafter.

It is assumed here that the K+L samples corresponding to the front (K samples) and end (L samples) pilots have been computed in step 310. A null vector with length M-K-L is inserted between the first K indices, the samples corresponding to the front pilots and in the last L indices, the samples corresponding to the end pilots.

The obtained pilots before the DFT-spread modulation are provided to a DFT spread modulation module 305 which first "spread" in frequency using a M-point normalized Discrete Fourier Transform, the resulting vector is then mapped onto a set of M out of N inputs of an inverse DFT by the sub-carrier mapping (N, M) matrix Q, resulting in the N-sized vector where the mapping matrix Q is basically used to insert null sub-carriers on the two band edges noted 511 and 512 of the M sub-carriers.

Finally, the DFT-spread OFDM signal is generated by applying an N-point normalized inverse Discrete Fourier Transform (DFT) onto the sub-carriers vector. It shall be noted that the front and end pilots can be computed in advance and stored in an appropriate storage means.

After the DFT-spread OFDM modulation 305, there is a pilot contribution onto the data part (on the samples with indices between P and N-R-1).

The outputs of the DFT spread modulation 305 and of the data contribution zeroing module 303 are provided to a combination module 306 which sums the DFT-spread OFDM symbol formed from the data and the DFT-spread OFDM symbol formed from the pilots.

Figure 5D:
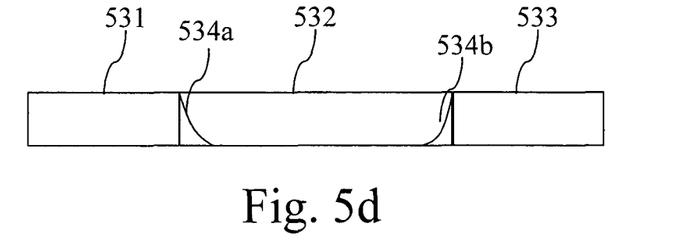

The DFT-spread OFDM symbol provided by the combination module symbol named full DFT-spread OFDM symbol is shown in FIG. 5d.

FIG. 5d is an example of a full DFT-spread OFDM symbol formed according to the present invention.

A part noted 531 comprises P samples, the following part noted 532 comprises N-P-R data samples and the last part 533 comprises R≤S samples where S is the number of samples of a guard interval.

The pilot contribution onto the data part after the DFT spread modulation is noted 534a and 534b.

The wireless interface comprises a data precoding module 300.

The data precoding module 300 performs a precoding of the data in order to compensate the data modification, like a zeroing onto front and end pilots as it will disclosed hereinafter. The data precoding module 300 modifies the M-K-L data samples that are conveyed by the hybrid reference DFT-spread OFDM symbol along with the front and end pilots in order to mask to the receiver the zeroing operation.

The principle of the precoding consists in compensating a modification of the data contribution onto a part of the DFT-spread OFDM modulated data symbol corresponding to the first part of the data symbol prior to the DFT-spread OFDM modulation.

For example, the modification of the data contribution onto the front and end pilot samples after a DFT-spread OFDM modulation is a zeroing the data contribution onto the pilot parts. Zeroing the data contribution onto the pilot parts will be disclosed hereinafter.

The data contribution on the demodulated data samples after zeroing can be expressed in a matrix form.

As the pilot part of the symbol is transmitted without any modification, the pilot contribution onto the demodulated data samples is null assuming a perfect equalizer.

It is thus possible to ignore the pilot contribution onto the demodulated data samples in the following computations.

Let's first compute the contribution of the data samples on the generated signal. In general, the generated signal can be expressed as follows:

$$y = H[f^T d^T e^T]^T \overset{def}{=} y^d + y^{f,e} = H^d d + H^{f,e} [f^T e^T]^T$$

where $H^{f,e} = H_{[0:N-1; 0:K-1 \cup M-L:M-1]}$ is the (N, K+L) matrix obtained by selecting in the matrix H the first K and L last columns and $H^d = H_{[0:N-1; K:M-L-1]}$ is the (N, M-K-L) matrix obtained by selecting in the matrix H the remaining M-K-L columns, $y^d$ is the contribution of the data samples prior DFT-spread OFDM modulation on the generated symbol after DFT-spread OFDM modulation and $y^{f,e}$ is the joint contribution of the front and end pilots samples prior DFT-spread OFDM modulation on the generated symbol after DFT-spread OFDM modulation.

The contribution of the data part onto the N-P-R central samples in y starting with index P is thus given by:

$$y_{[P:N-R-1]}^d = H_{[P:N-R-1; 0:M-K-L-1]} d,$$

The contribution of data samples to the pilot parts (first P and last R indices) is ignored here as it is forced to zero value by the zeroing operation. The contribution of the original data samples onto the demodulated data samples after setting to zero the contribution of data onto the pilot parts (first P and last R samples) is given by:

$$\tilde{s} = H[[0]_P^T y_{[P:N-R-1]}^{dT} [0]_R^T]^T = \overline{H}^d y_{[P:N-R-1]}^d,$$

where $\overline{H}^d = \overline{H}_{[0:M-1; P:N-R-1]}$ is the (M, N-P-R) matrix obtained by selecting in the matrix $\overline{H}$ the N-P-R central columns starting with index P.

After zeroing of the data contribution onto the pilot parts after DFT-spread OFDM modulation, the contribution of the data before DFT-spread OFDM modulation onto the data samples after DFT-spread OFDM demodulation, may be expressed as:

$$\bar{s}^d = \overline{H}_{[K:M-L-1;0:N-P-R-1]}{}^d y_{[P:N-R-1]}{}^d = \overline{H}_{[K:M-L-1;0:N-P-R-1]}{}^d H_{[P:N-R-1;0:M-K-L-1]}{}^d d,$$

The goal of the precoding is to alter the value of the data samples so as to minimize the distance between the demodulated samples altered by the zeroing operation and the original data.

A basic solution consists in adding a perturbation $\alpha_d$ to data so as to solve the following system:

$$\overline{H}_{[K:M-L-1;0:N-P-R-1]}{}^d H_{[P:N-R-1;0:M-K-L-1]}{}^d (d+\alpha_d) = d.$$

The solution can be thus obtained through the computation of the inverse of the product of matrices. The vector of data $d_{precoded}$ to be actually transmitted is thus obtained by multiplying the inverse matrix with the original vector of data.

$$d_{precoded} = (\overline{H}_{[K:M-L-1;0:N-P-R-1]}{}^d H_{[P:N-R-1;0:M-K-L-1]}{}^d)^{-1} d.$$

In case the data vector is long, it might be possible to reduce the computation burden by reducing the number of pre-coded data as those suffering from the highest modifications being those close to the zeroed parts i.e. near the pilots.

The precoded data are then transferred to a data generation module in the time domain 301.

The data generation module in the time domain 301 parses user data into blocks x of size M to form data symbols. The i-th data block x is written as:

$$x = [x_0, \ldots, x_{M-1}]^T,$$

where the reference to time is ignored for simplification. Each data block is composed of three parts comprising respectively data and zero values. An example of a data block is given in reference to FIG. 5a.

FIG. 5a is an example of a data block formed by the data generation module in the time domain 301 before DFT-spread OFDM modulation.

The data block is decomposed into three parts.

A part noted 501 comprises K null values, the following part noted 502 comprises M-K-L values and the last part noted 503 comprises L null values.

Each data block is provided to a DFT-spread modulation module 302.

The DFT-spread modulation module 302 performs the following process.

Data blocks x are first "spread" in frequency using a M-point normalized Discrete Fourier Transform (DFT) as follows:

$$s = F_M x,$$

where $F_M$ is the M-point normalized Discrete Fourier Transform (DFT) under the form of an (M, M) matrix with elements $F_{k,n} = \omega_M{}^{kn}/\sqrt{M}$ on the k-th row and n-th column. The resulting vector is then mapped onto a set of M out of N inputs of an inverse DFT by the sub-carrier mapping (N,M) matrix Q, resulting in the N-sized vector:

$$z = Qs,$$

where the mapping matrix Q is basically used to insert null sub-carriers on the two band edges. The signal above can also be expressed as a function of the original samples:

$$z = Qs = QF_M x \stackrel{def}{=} Gx,$$

where G is a (N, M) matrix.

Finally, the DFT-spread modulated OFDM signal is generated by applying an N-point normalized inverse Discrete Fourier Transform (DFT) onto the sub-carriers vector:

$$y = F_N^H z = F_N^H Qs = F_N^H QF_M x \stackrel{def}{=} Hx.$$

where H is a (N, M) matrix.

The output of the DFT-spread OFDM modulation module 302 is provided to a data contribution zeroing module 303.

After the DFT-spread OFDM modulation, there is a data contribution onto the front and end pilot parts. An example is given in reference in FIG. 5b.

FIG. 5b is an example of data contribution onto the pilot after the DFT-spread OFDM modulation.

A part noted 511 comprises P samples, the following part noted 512 comprises N-P-R data samples and the last part 513 comprises RSS samples, S being introduced hereafter. Using less samples than the regular size of the cyclic prefix enables reducing the spectral efficiency loss due to the insertion of the end pilots.

The data contribution onto the pilots after the DFT spread modulation is noted 514a and 514b.

The data contribution zeroing module 303 sets to null value all the values comprised in parts 511 and 513.

The outputs of the DFT-spread OFDM modulation 305 and of the data contribution zeroing module 303 are provided to a combination module 306 which sums the DFT-spread OFDM symbol formed from the data and the DFT-spread OFDM symbol formed from the pilots.

The DFT-spread OFDM symbol generated by the combination module symbol named full DFT-spread OFDM symbol is shown in FIG. 5d.

FIG. 5d is an example of a full DFT-spread OFDM symbol formed according to the present invention.

A part noted 531 comprises P samples, the following part noted 532 comprises N—P-R data samples and the last part 533 comprises R≤S samples.

The pilot contribution onto the data after the DFT-spread OFDM modulation is noted 534a and 534b.

The output of the combination module 306 is provided to a cyclic prefix addition module 307.

The use of a cyclic prefix to make circular the convolution with the channel response is especially important when relying on an inverse filtering approach for demodulation. As the channel appears to be circular, equivalent to the infinite and periodic transmission of the same pattern of samples, the application of the inverse filter is able to accurately recover the transmitted samples even if the inverse filter in the analogue domain would extend over a much longer support than the length of the sequence (or length of the FFT). Indeed, the inverse filter exploits the fact that the underlying signal is the everlasting duplication of the same set of samples. The same applies for the estimation of the channel that is performed by dividing the result of the OFDM demodulation by known samples, once again an inverse filtering operation.

The cyclic prefix addition module 307 feeds a guard interval of S samples with the last samples of the front pilot, i.e. to introduce a cyclic prefix related to the front pilot. The samples are inserted after completion of DFT-spread OFDM modulation. The cyclic prefix addition module 307 inserts in front of the generated symbol after DFT-spread OFDM modulation, S samples which are the copy of the last samples of the front pilots, samples with indices ranging from P−S to P−1. It shall also be mentioned that the front pilots need to be at least as long as the cyclic prefix which may be defined according to channel dispersions.

The introduction of a guard interval related to the front pilot enables an accurate estimation of the channel in the discrete domain.

But as a side effect, the overall symbol is preceded by a guard interval that is not cyclically related to the end samples of the full OFDM symbol. This is the purpose of the end pilot to allow for the generation of a signal with the last samples closely resembling to the cyclic prefix related to the front pilot.

Figure 5E:
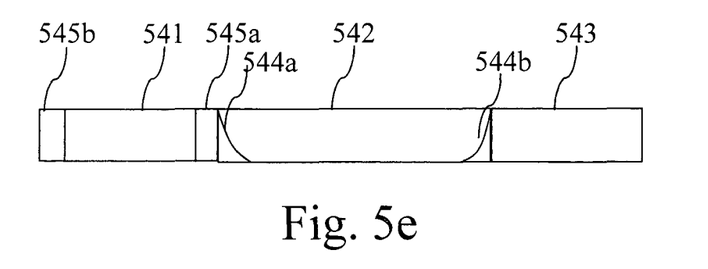

The example of cyclic prefix insertion is given in reference to FIG. 5e.

FIG. 5e is an example of a full DFT-spread OFDM symbol on which a cyclic prefix is inserted according to the present invention.

A part noted 541 comprises P samples, the following part noted 542 comprises N−P−R data samples and the last part 543 comprises R≤S samples.

The data contribution onto the pilot after the DFT-spread modulation is noted 534a and 534b.

The cyclic prefix addition module 307 feeds a guard interval of S samples noted 545b with the last samples 545a of the front pilot, i.e. to introduce a cyclic prefix related to the front pilot. The length of the end pilot can be set to a number of R≤S samples in order to reduce the loss in spectral efficiency at the expense of a lower robustness to highly degraded channels.

FIG. 4 represents an algorithm executed by the source in order to form DFT-spread OFDM symbols according to the present invention.

At step S400, front and eventually end pilots are generated.

The value of the reference samples that are used for generating the DFT-spread OFDM signal are computed in a similar way as the one performed by the front end pilot generation module 310 or obtained from a memory.

At step S401, the output of the front pilots (K samples) and the end pilots (L samples) generation step is generated in the time domain.

Pilots are inserted in the time domain prior to DFT spreading, i.e. with the ability to control the data/pilot ratio in a similar way as the one performed by the pilot generation module in the time domain 304.

The pilot generation in the time domain maps the pilots in the time domain as disclosed in FIG. 5c.

The pilot block is decomposed into three parts.

A part noted 521 comprises K front pilots as disclosed hereinafter, the following part noted 522 comprises M−K−L null values and the last part noted 523 comprises L end pilots as disclosed hereinafter.

It is assumed here that the K+L samples corresponding to the front (K samples) and end (L samples) pilots have been computed in step 310. A null vector with length M−K−L is inserted between the first K indices, the samples corresponding to the front pilots and the last L indices, the samples corresponding to the end pilots.

At next step S402, a DFT-spread OFDM modulation is performed on the pilots generated in the time domain.

The DFT-spread OFDM modulation first "spreads" in frequency the input samples using a M-point normalized Discrete Fourier Transform, the resulting vector is then mapped onto a set of M out of N inputs of an inverse DFT by the sub-carrier mapping (N, M) matrix Q, resulting in the N-sized vector where the mapping matrix Q is basically used to insert null sub-carriers on the two band edges noted 511 and 512 of the M sub-carriers.

Finally, the DFT-spread OFDM signal is generated by applying an N-point normalized inverse Discrete Fourier Transform (DFT) onto the sub-carriers vector. It shall be noted that the pilots can be computed in advance and stored in an appropriate storage means.

After the DFT-spread modulation, there is a pilot contribution onto the data part (on the samples with indices between P and N−R−1).

According to the DFT-spread OFDM modulation, the symbol generated after modulation is more or less the oversampled version of the original set of samples x. The length of each of the three parts after modulation is obtained by multiplying their length (respectively K, M−K−L and L) with the oversampling factor N/M.

At step S403, a precoding of the data is performed in order to compensate the data cancellation onto front and end pilots. The precoding of the data is performed in a similar way as the one performed by the data precoding module 300.

The precoding modifies the M−K−L data samples that are conveyed by the hybrid reference DFT-spread OFDM symbol along with the front and end pilots in order to mask to the receiver the zeroing operation.

The principle of the precoding consists in mitigating on the demodulated data samples the impact of a modification of the data contribution onto a part of the DFT-spread OFDM modulated data symbol corresponding to the first part or the first and third parts of the data symbol prior to the DFT-spread OFDM modulation.

For example, the modification of the data contribution onto the front and end pilot samples after a DFT-spread demodulation is a zeroing the data contribution onto the pilot parts. Zeroing the data contribution onto the pilot parts will be disclosed hereinafter.

At next step S404, a data symbol is generated in the time domain using the precoded data in a similar way as the one performed by the data generation module in the time domain 301.

The data generation in the time domain parses user data into blocks x of size M to form data symbols.

Each data block is composed of three parts comprising respectively data and zero values as disclosed in FIG. 5a.

A part noted 501 comprises K null values, the following part noted 502 comprises M−K−L values and the last part noted 503 comprises L null values.

At next step S405, a DFT spread OFDM modulation is performed for each data block in a similar way as the one performed by the DFT-spread OFDM modulation module 302.

At next step S406, a modifying of the part of the DFT-spread OFDM modulated data symbol corresponding to the first part and eventually the third part of the data symbol prior to the DFT-spread OFDM modulation is performed.

For example, the modifying of the part of the DFT-spread OFDM modulated data symbol corresponding to the first part of the data symbol prior to the DFT-spread OFDM modulation is a zeroing.

The zeroing is performed in a similar way as the one performed by the data contribution zeroing module 303.

At step S407, the outputs of the DFT-spread OFDM modulation step S403 and of the data contribution zeroing step S406 are combined in a similar way as the one performed by the combination module 306 which sums the OFDM symbol formed from the data and the DFT-spread OFDM symbol formed from the pilots.

At step S408, a cyclic prefix is added.

The cyclic prefix addition feeds a guard interval of S samples with the last samples of the front pilot, i.e. to introduce a cyclic prefix related to the front pilot. The samples are inserted after completion of DFT-spread OFDM modulation. The cyclic prefix addition module 307 inserts in front of the generated symbol after DFT-spread OFDM modulation, S samples which are the copy of the last samples of the front pilots, samples with indices ranging from P-S to P-1. It shall also be mentioned that the front pilot needs to be at least as long as the cyclic prefix which may be defined according to the channel dispersion.

The cyclic prefix addition is similar as the one performed by the cyclic prefix addition module 307.

The present invention may be applied to any DFT-spread OFDM based system. An example of implementation is given here in a modified implementation of the DVB-NGH broadcasting system specified in Non Patent Literature 5.

The DVB-NGH standard specifies a Hybrid Profile in addition to the Core Profile composed of a main component coming from the terrestrial network and an additional component coming from a satellite.

The SC-OFDM modulation has been selected along with OFDM as the two reference waveforms for the Hybrid Profile. The satellite component of the hybrid profile is defined for two bandwidths, 2.5 and 5 MHz for a transmission in the L and S-bands.

The DFT-spread OFDM mode of the NGH hybrid profile specifies a new pilot pattern defined as PP9. The PP9 pilot pattern is inserted one every 6 OFDM symbols.

Typically, Zadoff-Chu (ZC) sequences are used as pilot patterns, due to their low PAPR and their good orthogonality and correlation properties. DVB-NGH broadcasting system, in the last DFT-spread OFDM symbol of each NGH data section made of 6 symbols, half of the sub-carriers are allocated to DFT-spread data, while the other half of sub-carriers convey pilots. Data and pilots are multiplexed in the frequency domain i.e. not consecutive.

The present invention finds application in such system and enables to adjust the number of pilots in the frequency domain. For instance, assuming a system with N=512 (M=432) and a normalized Doppler spread up to 0.08, the present invention may provide better results by using Q=16, which means a front pilot with at least P=2Q=32 samples while the end pilot requires up to 16 additional samples. This corresponds to a number of K=27 samples for the front pilot and 14 samples for the end pilot, i.e. a total of 41 samples instead of 432/2=216 samples for the technique used in the DVB-NGH broadcasting system with PP9 pattern.

Furthermore, the present invention enables to define intermediate values in case a better channel estimation is required like K=54, P=64 or K=108 and P=128.

The symbols used for building the pilot maybe the same Zadoff-Chu sequence as used for the PP9 algorithm.

Naturally, many modifications can be made to the embodiments of the invention described above without departing from the scope of the present invention.

INDUSTRIAL APPLICABILITY

The method and device of this invention are applicable to methods and devices for forming a DFT-spread OFDM symbol including data and pilots in many kinds of fields.

The invention claimed is:

1. A method for forming a DFT-spread OFDM symbol including data and pilots, comprising:
    forming a pilot symbol in the time domain, the pilot symbol comprising at least two parts, a first part of the pilot symbol comprising samples of front pilots, a second part of the pilot symbol comprising null values and being consecutive to the first part of the pilot symbol,
    performing a DFT-spread OFDM modulation of the pilot symbol,
    precoding the data in order to compensate for a modification applied after DFT-spread OFDM modulation of a data contribution resulting from the DFT-spread OFDM modulation onto a part of a DFT-spread OFDM modulated data symbol corresponding to a first part of a data symbol prior to the DFT-spread OFDM modulation,
    putting the precoded data in the form of a data symbol in the time domain, the data symbol comprising at least two parts, a first part of the data symbol comprising null values, a second part of the data symbol comprising the precoded data, the second part of the data symbol being consecutive to the first part of the data symbol,
    performing the DFT-spread OFDM modulation of the data symbol,
    applying, after the DFT-spread OFDM modulation of the data symbol, the modification on the data contribution resulting from the DFT-spread OFDM modulation onto the part of the DFT-spread OFDM modulated data symbol corresponding to the first part of the data symbol prior to the DFT-spread OFDM modulation in order to form a DFT-spread OFDM modulated data symbol to be combined,
    combining the DFT-spread OFDM modulated data symbol to be combined to the DFT-spread OFDM modulated pilot symbol in order to form a full DFT-spread OFDM symbol.

2. The method according to claim 1, wherein pilot samples at the end of the first part of the DFT-spread OFDM modulated symbol corresponding to the first part of the pilot symbol prior to the DFT-spread OFDM modulation are copied in front of the DFT-spread OFDM modulated symbol.

3. The method according to claim 1, after the DFT-spread OFDM modulation of the data symbol, the modification on the data contribution is applied by zeroing the part of the DFT-spread OFDM modulated data symbol corresponding to the first part of the data symbol prior to the DFT-spread modulation.

4. The method according to claim 1, wherein the size of the first part of the data symbol is identical to the size of the first part of the pilot symbol and the size of the second part of the data symbol is identical to the size of the second part of the pilot symbol.

5. The method according to claim 2, wherein the pilot symbol comprises a third part, the third part of the pilot symbol comprising samples of end pilots and being consecutive to the second part of the pilot symbol, the data symbol comprising a third part, the third part of the data symbol comprising null values and being consecutive to the second part of the data symbol.

6. The method according to claim 5, wherein after the DFT-spread OFDM modulation of the data symbol, the modification on the data contribution is further performed onto the samples of the end pilots.

7. The method according to claim 6, wherein the samples of the end pilots are determined to be as identical as possible to the samples copied at the beginning of the first part of the pilot symbol.

8. The method according to claim 7, wherein the samples of the end pilots determined to be as identical as possible to samples from the beginning of the first part of the pilot symbol are determined according to a constrained quadratric distance.

9. The method according to claim 5, wherein after the DFT-spread OFDM modulation of the data symbol, the modification of the data contribution is applied by zeroing the part of the DFT-spread OFDM modulated data symbol corresponding to the third part of the data symbol prior to the DFT-spread modulation.

10. The method according to claim 5, wherein the size of the third part of the data symbol is identical to the size of the third part of the pilot symbol.

11. The method according to claim 1, wherein the part of the DFT-spread OFDM modulated pilot symbol corresponding to the second part of the pilot symbol prior to the DFT-spread OFDM modulation is not modified.

12. A device for forming a DFT-spread OFDM symbol including data and pilots, comprising:
a processor to execute a program and a memory to store the program which, when executed by the processor, performs processes of
forming a pilot symbol in the time domain, the pilot symbol comprising at least two parts, a first part of the pilot symbol comprising front pilots, a second part of the pilot symbol comprising null values and being consecutive to the first part of the pilot symbol,
performing a DFT-spread OFDM modulation of the pilot symbol,
precoding the data in order to compensate for a modification applied after DFT-spread OFDM modulation of a data contribution resulting from the DFT-spread OFDM modulation onto a part of a DFT-spread OFDM modulated data symbol corresponding to a first part of the data symbol prior to the DFT-spread OFDM modulation,
putting the precoded data in the form of a data symbol in the time domain, the data symbol comprising at least two parts, a first part of the data symbol comprising null values, a second part of the data symbol comprising the precoded data, the second part of the data symbol being consecutive to the first part of the data symbol,
performing the DFT-spread OFDM modulation of the data symbol,
applying, after the DFT-spread OFDM modulation of the data symbol, the modification of the data contribution resulting from the DFT-spread OFDM modulation onto the part of the DFT-spread OFDM modulated data symbol corresponding to the first part of the data symbol prior to the DFT-spread OFDM modulation in order to form a DFT-spread OFDM modulated data symbol to be combined,
combining the DFT-spread OFDM modulated data symbol to be combined to the DFT-spread OFDM modulated pilot symbol in order to form a full DFT-spread OFDM symbol.

* * * * *